(12) United States Patent
Kämpf

(10) Patent No.: US 7,829,654 B2
(45) Date of Patent: Nov. 9, 2010

(54) METHOD FOR PRODUCING ELASTOMERIC COPOLYESTERS

(75) Inventor: Rudolf Kämpf, Haingründau (DE)

(73) Assignee: Lurgi Zimmer GmbH, Frankfurt am Main (DE)

( * ) Notice: Subject to any disclaimer, the term of this patent is extended or adjusted under 35 U.S.C. 154(b) by 728 days.

(21) Appl. No.: 11/579,941

(22) PCT Filed: Feb. 23, 2005

(86) PCT No.: PCT/EP2005/001853

§ 371 (c)(1),
(2), (4) Date: Sep. 10, 2007

(87) PCT Pub. No.: WO2005/116111

PCT Pub. Date: Dec. 8, 2005

(65) Prior Publication Data

US 2008/0161530 A1 Jul. 3, 2008

(30) Foreign Application Priority Data

May 11, 2004 (DE) ........................ 10 2004 023 105

(51) Int. Cl.
*C08G 63/66* (2006.01)

(52) U.S. Cl. ........................ 528/300; 528/271; 528/272; 528/297; 528/301; 528/307; 528/491; 528/497; 528/498; 526/72; 526/77; 540/538; 525/10; 525/50

(58) Field of Classification Search ................. 528/271, 528/272, 274, 297, 301, 307, 308.3, 491, 528/497, 498; 526/72, 77; 540/538; 525/10, 525/50
See application file for complete search history.

(56) References Cited

U.S. PATENT DOCUMENTS 3,050,533 A * 8/1962 Maclean et al. ............. 549/509
4,081,494 A    3/1978 Sakai ......................... 260/860

FOREIGN PATENT DOCUMENTS

| JP | 06057630 A * | 3/1994 |
| JP | 08231706 A * | 9/1996 |
| WO | WO9511267 | 4/1995 |

OTHER PUBLICATIONS

Machine translation of JP 06-057630.*
Machine translation of JP 08-231706.*
* cited by examiner

*Primary Examiner*—Ling-Siu Choi
*Assistant Examiner*—Frances Tischler
(74) *Attorney, Agent, or Firm*—Jonathan Myers; Andrew Wilford

(57) ABSTRACT

A process for continuous or discontinuous synthesis of elastomeric copolyesters from polybutylene terephthalate (PBT) and polyoxytetramethylene glycol is described in which the tetrahydrofuran (THF) obtained as a byproduct in synthesis of polybutylene terephthalate from 1,4-butanediol is rectified and then reacted by ring-opening polymerization to form polyoxytetramethylene glycol which condenses with the free or esterified carboxyl groups of PBT to form the copolyester, whereby chain termination and catalyst deactivation are accomplished by adding 1,4-butanediol without separating the catalyst.

10 Claims, 2 Drawing Sheets

METHOD FOR PRODUCING ELASTOMERIC COPOLYESTERS

CROSS REFERENCE TO RELATED APPLICATIONS

This application is the US national phase of PCT application PCT/EP2005/001853 filed 23 Feb. 2005 with a claim to the priority of German patent application 102004023105.2 itself filed 11 May 2004.

FIELD OF THE INVENTION

This invention relates to a method for producing an elastomeric copolyester of polybutylene terephthalate (PBT) and polyoxytetramethylene glycol.

The object of this invention is a method for producing an elastomeric copolyester of polybutylene terephthalate (PBT) and polyoxytetramethylene glycol.

BACKGROUND OF THE INVENTION

A method for continuous production of high-molecular polybutylene terephthalate by esterification of terephthalic acid with 1,4-butanediol is known from German Patent 35 44 551. In this process, starting materials are blended to form a paste and sent for esterification in the presence of a suitable catalyst. Esterification is performed at pressures of 0.1 bar to 0.6 bar at which water can also be split off. In the main reaction of the carboxyl groups with the hydroxyl groups of 1,4-butanediol, dehydration of the butanediol also takes place, leading to tetrahydrofuran, but other byproducts whose structure and quantity depend on the 1,4-butanediol synthesis process may also be formed in low concentrations.

The polycondensation which follows esterification is preferably performed at pressures of 0.25 to 25 mbar and temperatures of approximately 270° C., but it is only possible to work in a single reaction apparatus from the group of stirred vessels, horizontal units of the ring disk type and/or cage reactor type. A resulting long chain polycondensate contains the monomer building blocks in a random distribution.

The copolyesters produced by the methods known so far have valuable elastomeric properties and are therefore being used commercially to an increasing extent. Consequently there is a demand for further improvements in and simplifications of the known processes, in particular in reducing the so far substantial cost of equipment and utilities.

OBJECT OF THE INVENTION

The object of the invention is to provide an improved method for producing an elastomeric copolyester of polybutylene terephthalate (PBT) and polyoxytetramethylene glycol.

SUMMARY OF THE INVENTION

Applicants are disclosing a process for synthesizing an elastomeric copolyester from polybutylene terephthalate (PBT) and polyoxytetramethylene glycol, which comprises the steps of:

(a) obtaining crude tetrahydrofuran (THF) as a by-product in a synthesis of polybutylene terephthalate wherein starting materials in the synthesis include 1,4-butanediol and free or esterified terephthalic acid and separating the crude tetrahydrofuran from the polybutylene terephthalate;

(b) rectifying the crude tetrahydrofuran to separate impurities to yield purified tetrahydrofuran;

(c) subjecting the purified tetrahydrofuran to a ring-opening polymerization in the presence of a Lewis acid catalyst to synthesize polyoxytetramethylene glycol, and (d) condensing the polyoxytetramethylene glycol with free or esterified carboxy groups of polybutylene terephthalate to form the elastomeric copolyester, with chain termination and catalyst deactivation accomplished by addition of 1,4-butanediol without separating the Lewis acid catalyst.

In a preferred feature according to step (d) the amount of the polyoxytetramethylene glycol is 1 wt % to 60 wt % of the amount of polybutylene terephthalate.

In another preferred feature according to step (c) the polyoxytetramethylene glycol is synthesized by ring-opening cationic polymerization to form an average chain length of 2 to 10,000 recurring units.

In another preferred feature, following step (b), the purified tetrahydrofuran formed in the synthesis of polybutylene terephthalate is subjected to deperoxidation and drying.

In another preferred feature according to step (d) the polyoxytetramethylene glycol is added to the polybutylene terephthalate during prepolycondensation or polycondensation. More preferably the polyoxytetramethylene glycol added to the polybutylene terephthalate has a polydispersity less than 10.

According to step (d) of the new process, the polyoxytetramethyleneglycol may be used without prior purification.

According to the new process, the elastomeric copolymer is synthesized continuously or discontinuously.

In a preferred feature according to step (a) the synthesis of polybutylene terephthalate is controlled in such a way that tetrahydrofuran is formed from 1,4-butanediol in a highest possible concentration and to minimize formation of interfering by-products, so that the amount of tetrahydrofuran formed is set at 5 wt % to 60 wt % of the starting 1,4-butanediol, and at the same time the formation of by-products is suppressed.

The amount of tetrahydrofuran formed is set at 5 wt% to 60 wt % of the starting 1,4-butanediol, and at the same time the formation of by-products is suppressed by working at pressures of 0.05 bar to 10 bar, at temperatures between 160° C. and 320° C. and in the presence of a catalyst that contains titanium, tin or antimony, and which can be used in an amount of $10^{-10}$ to $10^{-2}$ moles per mole of terephthalic acid.

A process for synthesizing an elastomeric copolyester of polybutylene terephthalate (PBT) and polyoxytetramethylene glycol has been discovered in which the tetrahydrofuran (THF) obtained as a byproduct in the production of polybutylene terephthalate from 1,4-butanediol is converted by ring-opening polymerization to polyoxytetramethylene glycol, which is condensed with the free or esterified carboxyl groups of PBT to form the copolyester, where chain termination and catalyst deactivation are performed by adding 1,4-butanediol without separating the catalyst.

THF formed in this process and water formed in esterification and condensation are removed as a volatile phase from the synthesis process and the separated THF is polymerized by cationic ring-opening polymerization to form polyoxytetramethylene glycol after removing impurities. This polymeric glycol is added to PBT during transesterification, precondensation and polycondensation and is incorporated into the polymer chain as a soft chain element.

This chain element is of crucial importance for the excellent elastomeric properties of the copolyester synthesized according to the present invention.

Production of the polybutylene terephthalate (PBT), which serves as the starting material, by esterification of terephthalic acid with 1,4-butanediol or by transesterification of a terephthalic acid diester with 1,4-butanediol is an essentially known process. In this reaction, butenols and various dihydrofurans and cyclic ethers are also formed from the 1,4-butanediol in small quantities in addition to the main product tetrahydrofuran formed due to a dehydrating reaction. The type and amount of these byproducts depend on the synthesis process used for the 1,4-butanediol. They cause interference in the synthesis of the elastomeric copolyester for which a high-purity THF is required. It is therefore necessary to carefully purify by rectification the product mixture obtained by side reactions from 1,4-butanediol. To minimize the associated complexity, it is advisable to control the reaction in such a way that THF is formed from 1,4-butanediol in the highest possible concentration and only small quantities of interfering byproducts are formed. Through the choice of suitable operating conditions, in particular the use of selected pressures, temperatures and special catalysts during esterification, precondensation and polycondensation, the amount of THF formed can be set at 5 wt % to 60 wt % of the starting 1,4-butanediol, and at the same time the formation of byproducts can be largely suppressed. It is advantageous to work at pressures of 0.05 bar to 10 bar, at temperatures between 160° C. and 320° C. and in the presence of catalysts that contain titanium, tin or antimony and which are used in an amount of $10^{-10}$ to $10^{-2}$ mol per mol terephthalic acid.

The tetrahydrofuran formed by the cyclizing dehydration reaction is contained in different amounts in the vapors leaving the transesterification reactor and the condensation reactors; this tetrahydrofuran is condensed and a combined stream is sent for a first rectification. The highest-boiling 1,4-butanediol remains in the sump of the rectification column and is recycled mainly to the esterification reactor. The lower-boiling components of the head product are fractionated, condensed and rectified to yield a THF of the highest purity.

For synthesis of the polyoxytetramethylene glycol required for the inventive process by cationic ring-opening polymerization, traces of peroxides must also be removed from the product obtained by rectification. This is accomplished by adding hydrogen. Furthermore, careful drying of the THF thus obtained is required.

The high-purity THF obtained by these process steps is then polymerized by using catalysts of the Lewis acid type, such as boron trifluoride, antimony pentachloride, titanium tetrachloride or halosulfonic acids (see Houben-Weyl, $4^{th}$ edition, volume E20/1, pages 106 ff, 448 ff). To create polyoxytetramethylene glycols having medium chain lengths of 2 to 10,000 recurring units, a catalyst in an amount between $10^{-12}$ mol to $10^{-2}$ mol catalyst metal, based on THF, is needed, and may also be added to the reaction vessel in several portions up to the highest amount. The temperature profile in ring-opening polymerization is kept between !70° C. and +80° C. and the dwell time in the reaction vessel is between 5 minutes and 10 hours, which ensures that a polyoxytetramethylene glycol having an average chain length of 2 to 10,000 recurring units is synthesized. The distribution of the recurring units is measured by gel permeation chromatography in THF and the results are calibrated against a polyoxytetramethylene glycol standard.

Polymerization of THF is controlled in a known way by monitoring the pressure and temperature conditions and the dwell time in the reaction vessel, so as to yield a narrow distribution with a polydispersity, defined by the ratio of the weight-average molecular weight to the number-average molecular weight, which is generally close to 1 is obtained. However, polyoxytetramethylene glycols with a polydispersity of up to 10 can also be synthesized by using suitable polymerization conditions such that these materials can be condensed with PBT by the method according to this invention to yield elastomeric copolyesters. The number-average molecular weight required for calculating the polydispersity is determined in the membrane osmometer and the weight-average molecular weight is determined by light scattering.

The resulting polyoxytetramethylene glycol with PBT in an amount of 1 wt % to 60 wt %, based on the amount of PBT, is added during transesterification, precondensation or polycondensation.

With the synthesis methods known in the past for elastomeric copolyesters from PBT and polyoxytetramethylene glycol, chain growth is terminated by adding chain terminators and/or by hydrolysis of the catalyst. After termination of the polymerization reaction, the catalyst must then be removed from the product because it can lead to discoloration and formation of gels in the case of mixture or blending of polyoxytetramethylene glycol with other polymers in an extruder at high temperatures. The problem of discoloration of polymers due to catalyst residues can therefore be solved only by removing the catalyst from the polymer in several washing steps. However, then some low-molecular fractions of the polyoxytetramethylene glycol also go into solution so that the molecular weight distribution changes. Removal of catalyst residues by washing out also has the serious disadvantage that solvents and/or detergents become loaded with low-molecular polymer components the disposal or processing of which are also time-consuming and expensive. They are either disposed of by incineration or by biodegradation in a sewage treatment facility or the solvent is separated from the admixtures and carried in circulation.

The inventive process avoids these disadvantages of the processes customary in the past because it is not necessary to destroy or separate the catalyst in a separate step and no solvents need be used for workup. In the inventive process the 1,4-butanediol is used not only as a building block of the copolyester, but also as a chain terminator. It reacts with the Lewis catalyst not only by deactivating it but it also forms a titanium tetrabutylate by reaction of titanium tetrachloride with 1,4-butanediol, for example, which acts as a catalyst in polycondensation, optionally together with other added metal esters, to promote the formation of the elastomeric copolyester. This makes it possible to reduce the amount of metal ester catalysts to be added.

The metal esters used to produce the elastomeric copolyester of polyoxytetramethylene glycol and PBT synthesized according to this invention consist of the elements of main groups I, II, III, IV and V and subgroups III, IV, V, VI, VII and VIII of the Periodic System, and especially preferably consist of metal esters of V, Ta, Ti, Zr, Mn, Zn, B, Al, Si, GE, P, Sb, Fe, Co, Ca, Mg or Sn.

Typical representatives of this class of catalysts include barium diisopropylate, calcium dimethylate, calcium diisopropylate, magnesium dimethylate and magnesium diethylate, strontium diisopropylate, aluminum triethylate, aluminum triisopropylate, aluminum tributylate, aluminum tert-butylate, aluminum triphenolate, antimony trimethylate, antimony triethylate, antimony triisopropylate, antimony tripropylate, antimony tributylate, boron trimethylate, boron triethylate, boron tripropylate, boron triisopropylate, boron tributylate, boron triphenolate, erbium triisopropylate, indium triisopropylate, indium tert-butylate, neodymium triisopropylate, vanadium(V) oxide triethylate, vanadium(V) oxide triisopropylate, vanadium (V) oxide tripropylate, ytterbium triisopropylate, yttrium triisopropylate, yttrium triisopropylate, yttrium triisobutylate, trimethyl phosphite, triethyl phosphite, tripropyl phosphite, triisopropyl phosphite, tributyl phosphite, triphenyl phosphite, triisodecyl phosphite, trimethyl phosphate, triethyl phosphate, tripropyl phosphate, triisopropyl phosphate, triethylhexyl phosphate, tributyl phosphate, triphenyl phosphate, tricresyl phosphate, scandium triisopropylate, praseodymium triisopropylate, germanium methylate, germanium ethylate, germanium isopropylate, hafnium tert-butylate, tetramethoxysilane, tetraethoxysilane, tetrapropoxysilane, tetrabutoxysilane, tetramethoxytitanium, tetraethoxytitanium, tetraisopropoxytitanium, tetra-propoxytitanium, tetrabutoxytitanium, tetra-tert-butoxytitanium, tetra-2-ethylhexanoate titanium, tetra-2-ethyl-1,3-hexanediolate titanium, tetrabutoxy-stannane, tetramethoxyzirconium, tetra-tert-butoxyzirconium, tantalum(V) methoxide, tantalum(V) ethoxide, tantalum(V) butoxide.

The inventive process offers considerable economic advantages because equipment parts that have been needed in the past are superfluous now because it is no longer to separate the catalyst nor to work up the polyoxytetramethylene glycol and the solvent required for removing catalyst residues and furthermore a substantial amount of energy can be saved due to the process steps thereby eliminated. Finally, environmental pollution is also reduced by the inventive process because it is not necessary to incinerate any substances or purify them through treatment processes or dump them.

The inventive process may be carried out continuously or discontinuously, as illustrated by the two embodiments described below.

DETAILED DESCRIPTION OF THE DRAWINGS

Embodiment 1

Figure 1:
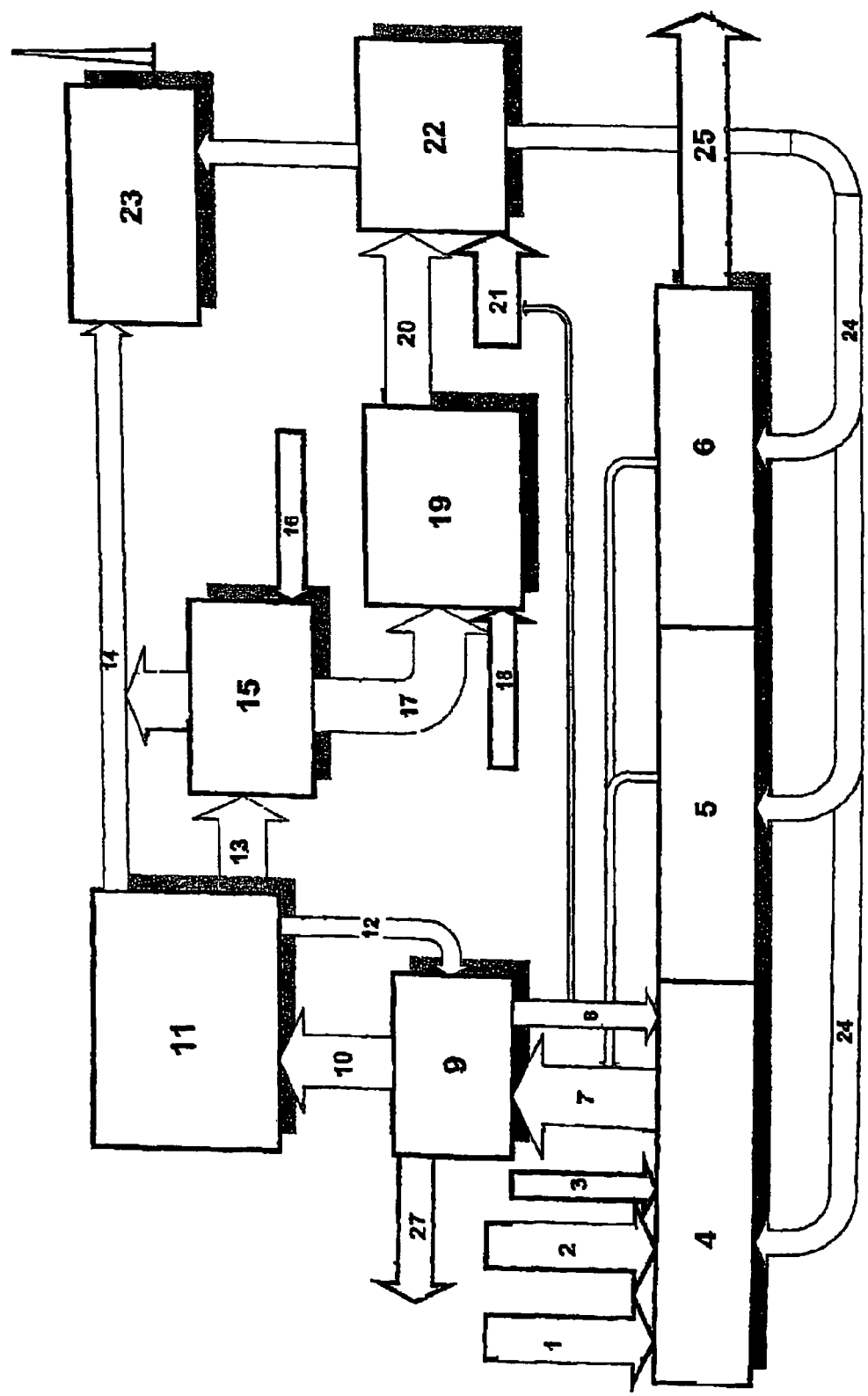
FIG. 1 is a schematic diagram according to the invention setting forth a continuous process for producing an elastomeric copolyester of polybutylene terephthalate (PBT) and polyoxy-tetramethylene glycol.
Figure 2:
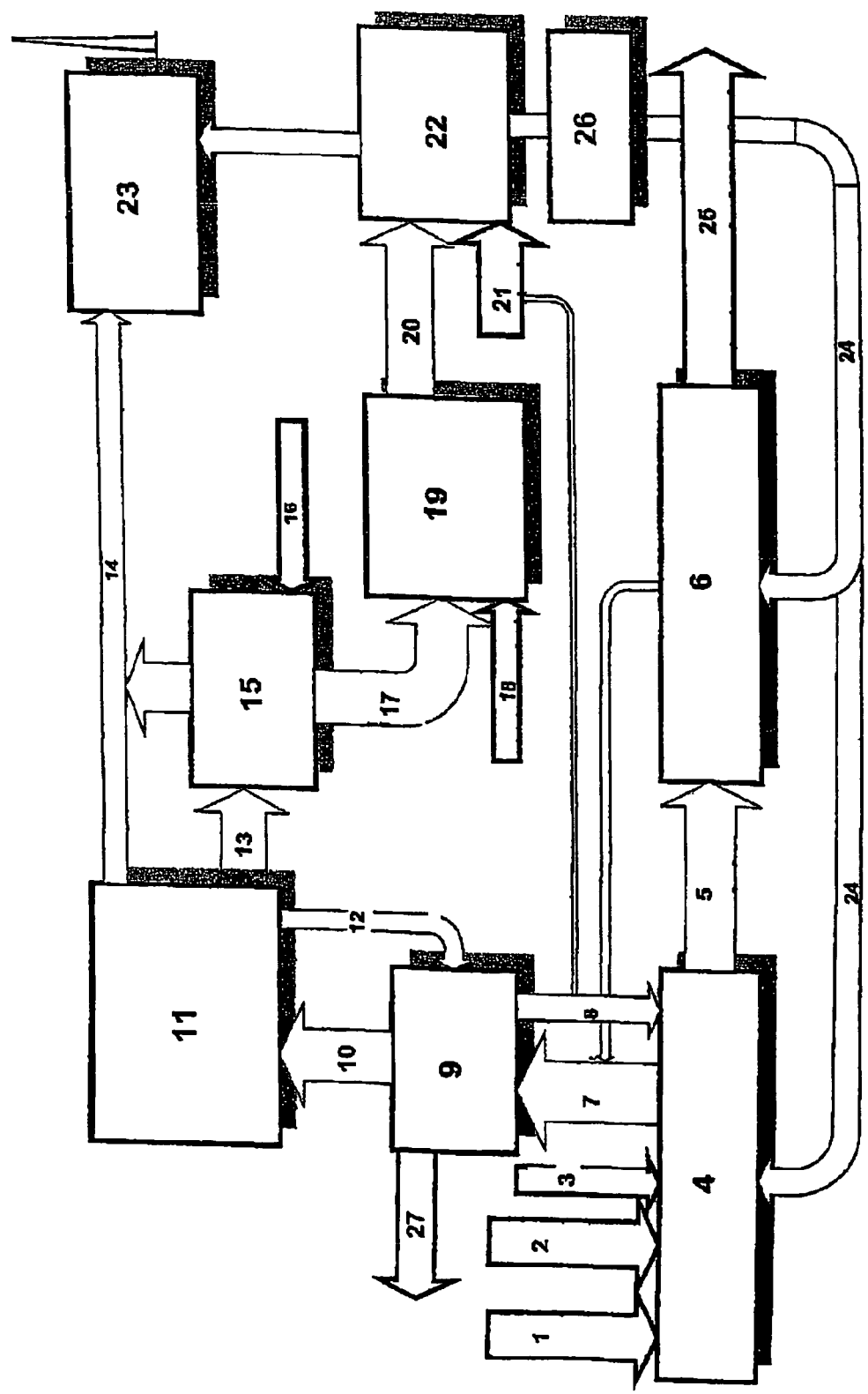
FIG. 2 is a schematic diagram according to the invention setting forth a batch (discontinuous) process for producing an elastomeric copolyester of polybutylene terephthalate (PBT) and polyoxy-tetramethylene glycol.

In the esterification step (4), a mixture of terephthalic acid (1) and 1,4-butanediol (2) but is stirred to form a paste is combined continuously in a molar ratio of 1:5 with a catalyst (3), e.g., 500 ppm tin (IV) tetrabutylate and fed into a stirred vessel. At a slight excess pressure of approximately 0.25 MPa and 250° C., the esterification is initiated and after an average dwell time of 5 hours in a second reactor, stirring is continued at a reduced pressure of 0.1 MPa and a temperature of approximately 235° C. with a dwell time of 3 hours. In addition to the main reaction of the carboxyl groups of terephthalic acid (1) with the hydroxyl groups of 1,4-butanediol (2), there is also dehydration of butanediol to tetrahydrofuran (10) with other byproducts being formed in small quantities.

The vapors (7) escaping from the reactors used in esterification (4) contain mainly water and up to 60% tetrahydrofuran which is sent for cleavage product separation (9). In cleavage product separation (9), 1,4-butanediol (2), which is entrained in the vapors, the cleavage product water and the readily volatile THF, all of which are entrained in the vapors, are separated in at least one column under a slight excess pressure of 0.15 MPa by repeated rectification. The butanediol (8) collecting in the sump of the column (9) is recycled back to the first esterification reactor (4) and added to the paste of (1) and (2). The feed of a substream of 10 wt % to 60 wt % of the polyoxytetramethylene glycol (25) which is preferably generated in a parallel process and which may also be used even without purification, takes place in the transesterification reactor or a condensation reactor.

The prepolycondensation (5) which follows esterification is performed at approximately 250° C. in vacuo at 150 hPa, for which purpose only one reactor need be used, namely either a stirred vessel or a horizontal apparatus of the ring disk reactor type and/or cage reactor type. The vapors escaping from the precondensation step (5) in vacuo are condensed in vapor condensers and the condensates are sent to the cleavage product stream (7). The polycondensation is continued to the end in the polycondensation (6) step which follows precondensation (5) and leads to longer polyester chains, ultimately leading to the end product (25), at a 20° C. higher temperature and a pressure of 0.1 hPa. The polyoxytetramethylene glycol is incorporated in random distribution into the growing chains of the copolyester.

In polycondensation of the carboxyl groups of PBT with the hydroxyl groups of polyoxytetramethylene glycol, water is obtained as a reaction product. In addition, besides the main product tetrahydrofuran, butenols, various dihydrofurans and other cyclic ethers are formed in dehydration of 1,4-butanediol. Furthermore, the vapors also contain 1,4-butanediol which should remain as a monomer with the remaining process. Separating the multi-substance mixture in cleavage product separation (9) requires several steps in which fractions are separated according to the different boiling points. The high boiling fractions of butanediol (8) are added back to the process, the resulting water (27) is treated so that it has a very low impurities content and can be sent to a biological clarification system. The resulting tetrahydrofuran, the crude THF (10), still contains small amounts of water and ingredients that cannot be removed due to the formation of an azeotrope in the cleavage product separation (9). To eliminate these constituents, the crude THF (10) is sent for another byproduct rectification (11), whereby semipermeable membranes can also be used with good results in addition to the distillation and rectification process. An extremely pure THF (13) then leaves the byproduct rectification step (11), still containing only minor traces of water and other substances. Low-boiling substances, high-boiling substances and exhaust gases (14) from flushing or inertization of the system with nitrogen are removed and sent to a heat-generating plant (23) which ensures a supply of high-temperature oil to the polycondensation system.

To produce polyoxytetramethylene glycols by cationic polymerization, the THF (13) leaving the byproduct rectification step (11) is still not pure enough for this purpose because it still contains peroxide ingredients and traces of THF byproducts, which could deactivate the catalyst for the cationic polymerization.

In step (15), the peroxides are destroyed by deperoxidation, reduction and drying on zeolitic supports, such as those described by D. R. Burfiled in *J. Org. Chem.* 47, 3821 (1982) in several successive steps using a small stream of hydrogen (16). In addition, double bonds are hydrogenated and the last traces of water are removed. The process step (15) is designed to run in two lines so that a portion of the installation is in the regeneration phase while purification of THF is being performed in the other part of the system. The exhaust gases (15) formed during regeneration are combined with the stream (14) and sent for catalytic oxidation (23). THF (17) leaving the system part (15) meets the quality requirements "polymer grade" with a water content of less than 100 ppm, less than 50 ppm dihydrofurans and less than 50 ppm isomeric substituted THF derivatives. Such a THF can be used without restrictions in THF polymerization (19).

THF can be polymerized in the presence of $10^{-6}$ ppm tin tetrachloride, for example, based on tetrahydrofuran. The temperature program in the multistage stirred vessel cascade (19) is in the range between !10° C. and +30° C. and a dwell time of between 2 and 4 hours is selected to yield a product having chain lengths of 2 to 10,000 recurring units. The reaction process in ring-opening polymerization of tetrahydrofuran, as described by P. Dreyfuss and M. P. Dreyfuss in *Adv. Polymer Sci.,* vol. 4, pages 528 to 590 (1967) is controlled by temperature management, type of catalyst, catalyst concentration and catalyst feed so as to yield a narrow distribution with a polydispersity, defined by the ratio of the weight-average molecular weight to the number-average molecular weight, preferably close to 1 and no greater than 10.

With the production processes known in the past (see *Encyclopedia of Polymer Science and Engineering,* vol. 16, page 649 (1989)), chain growth is terminated by chain terminators and/or hydrolysis of the catalyst. This is performed in the last step (22) of the stirred vessel cascade, whereby it has surprisingly been found that butanediol can be used as the chain regulator (21). Use of 1,4-butanediol as a chain regulator (21) has the advantage that this is a substance that is used as a monomer according to this invention and therefore is not a foreign substance in the end product. It has proven to be especially advantageous to use as the chain regulator (21) a butanediol that is either taken from an intermediate plate of the cleavage product separation column (9) or from the sump. The polyoxytetramethylene glycols obtained in this way have a higher reactivity and better filtration properties than the polyoxytetramethylene glycols known in the past when they are used as a feed for esterification (4), precondensation (5) and/or polycondensation (6).

In the inventive process, catalyst residues need not be removed from the end product because they do not lead to discoloration or form gels even in the presence of other polymers in an extruder at high temperatures, so the washing steps that would otherwise be customary to remove the catalyst residues can be omitted.

The chain length can also be limited and the catalyst can be deactivated with other monovalent or polyvalent alcohols as well. However, the use of 1,4-butanediol is especially advantageous for the reasons given above. The metal esters formed by the reaction of 1,4-butanediol with the metal catalysts promote esterification (4), precondensation (5) and/or polycondensation (6).

The polyoxytetramethylene glycol leaving the process step (22) (chain termination) is either sent completely for esterification (4), precondensation (5) and/or polycondensation (6), as illustrated in FIG. 1, or is distributed in equal or different quantities among the esterification and condensation reactors.

The elastomeric copolyester leaving the final reactor of the polycondensation step (6) consists of a polybutylene terephthalate ester basic polymer modified with randomly distributed polyoxytetramethylene glycol groups and having the properties of a copolyester described in the literature (J. Brandrup and E. H. Immergut in *Polymer Handbook,* $3^{rd}$ edition, John Wiley & Sons, page V/107).

Embodiment 2

In an esterification reactor (4), a mixture having a molar ratio of 1:5 of terephthalic acid (1) and 1,4-butanediol (2) with a catalyst (3), e.g., 500 ppm tin (IV) tetrabutylate, is stirred to a paste and introduced continuously into an esterification reactor (4) over a period of 15 minutes to 6 hours. Esterification is initiated starting with an excess pressure of approximately 0.35 MPa and at approximately 210° C.; after an average dwell time of 5 hours, the pressure is reduced to 0.1 MPa over a period of 6 hours, but at the same time the temperature is gradually increased to 250° C. In the main reaction of the carboxyl group of terephthalic acid (1) with the hydroxyl groups of 1,4-butanediol (2), dehydration of the butanediol to tetrahydrofuran (10) takes place as a side reaction, whereby additional byproducts are formed in low concentrations at the same time. The vapors (7) escaping from the esterification reactor (4) contain mostly water and up to 60% tetrahydrofuran, which is condensed, collected and sent to cleavage product separation (9), which is operated in batches. In cleavage product separation (9), the 1,4-butanediol (2) entrained in the vapors is separated from water and also from readily volatile THF in at least one column under a slight excess pressure of 0.75 MPa by repeated rectification. The butanediol (8) collected in the sump of the column (9) is recycled back to the esterification reactor (4) or collected and added to the next batch of paste from (1) and (2).

At the same time in a parallel process, polyoxytetramethylene glycol (25) is synthesized from THF purified by rectification and deperoxidation in the same way as in continuous production. In discontinuous production, however, the polyoxytetramethylene glycol is not introduced directly into the esterification reactor (4) or the polycondensation reactor (6) but instead is first stored in a storage container (6) that serves as a buffer. The polyoxytetramethylene glycol is stored in this storage container at temperatures between !10° C. and +10° C. A heating device is provided to remelt any material that has solidified, so that the molten material is sent to the esterification reactor (4) or the polycondensation reactor (6) via conveyor elements and metering equipment in the required amount of 10 wt % to 60 wt %, based on the elastomeric polymer to be synthesized according to this invention).

LIST OF REFERENCE NUMERALS 1 addition of terephthalic acid
2 addition of 1,4-butanediol
3 addition of catalyst
4 reactor for esterification and transesterification
5 reactor for precondensation and polytransesterification
6 reactor for polycondensation
7 separation of gaseous and liquid byproducts formed in esterification
8 feed of 1,4-butanediol
9 separation of the liquid and gaseous byproducts formed in esterification and condensation
10 discharge of crude THF
11 rectification of THF
12 recycling low-boiling constituents
13 discharge of THF
14 discharge of low-boiling and high-boiling byproducts and exhaust gases
15 deperoxidation, reduction and drying of THF
16 feed of hydrogen 17 discharge of polymerizable THF
18 feed of a catalyst
19 polymerization of THF
20 feed of crude polyoxytetramethylene glycol
21 addition of a chain regulator
22 chain termination in polymerization
23 generation of heat in catalytic oxidation
24 feed of polyoxytetramethylene glycol for esterification and/or polycondensation
25 discharge of the end product
26 storage container for polyoxytetramethylene glycol
27 discharge of water

The invention claimed is:

1. A process for synthesizing an elastomeric copolyester from polybutylene terephthalate (PBT) and polyoxytetramethylene glycol, which comprises the steps of:
   (a) obtaining crude tetrahydrofuran (THF) as a by-product in a synthesis of polybutylene terephthalate wherein starting materials in the synthesis include 1,4-butanediol and free or esterified terephthalic acid and separating the crude tetrahydrofuran from the polybutylene terephthalate;
   (b) rectifying the crude tetrahydrofuran to separate impurities to yield purified tetrahydrofuran;
   (c) subjecting the purified tetrahydrofuran to a ring-opening polymerization in the presence of a Lewis acid catalyst to synthesize polyoxytetramethylene glycol, and
   (d) condensing the polyoxytetramethylene glycol with free or esterified carboxy groups of polybutylene terephthalate to form the elastomeric copolyester, with chain termination and catalyst deactivation accomplished by addition of 1,4-butanediol without separating the Lewis acid catalyst.

2. The process defined in claim 1 wherein according to step (d) the amount of the polyoxytetramethylene glycol is 1 wt% to 60 wt% of the amount of polybutylene terephthalate.

3. The process defined in claim 1 wherein according to step (c) the polyoxytetramethylene glycol is synthesized by ring-opening cationic polymerization to form an average chain length of 2 to 10,000 recurring units.

4. The process defined in claim 1 wherein following step (b) the purified tetrahydrofuran formed in the synthesis of polybutylene terephthalate is subjected to deperoxidation and drying.

5. The process defined in claim 1 wherein according to step (d) the polyoxytetramethylene glycol is added to the polybutylene terephthalate during prepolycondensation or polycondensation.

6. The process defined in claim 5 wherein the polyoxytetramethylene glycol added to the polybutylene terephthalate has a polydispersity less than 10.

7. The process defined in claim 1 wherein according to step (d) the polyoxytetramethylene glycol is used without prior purification.

8. The process defined in claim 1 wherein the elastomeric copolymer is synthesized continuously or discontinuously.

9. The process defined in claim 1 wherein according to step (a) the synthesis of polybutylene terephthalate is controlled in such a way that tetrahydrofuran is formed from 1,4-butanediol in a highest possible concentration and to minimize formation of interfering by-products, so that the amount of tetrahydrofuran formed is set at 5 wt% to 60 wt% of the starting 1,4-butanediol, and at the same time the formation of by-products is suppressed.

10. The process defined in claim 9 wherein the amount of tetrahydrofuran formed is set at 5 wt% to 60 wt% of the starting 1,4-butanediol, and at the same time the formation of by-products is suppressed by working at pressures of 0.05 bar to 10 bar, at temperatures between 160° C. and 320° C. and in the presence of a catalyst that contains titanium, tin or antimony, and which can be used in an amount of $10^{-10}$ to $10^{-2}$ moles per mole of terephthalic acid.

* * * * *